Sept. 19, 1967    J. W. BORMAN ETAL    3,342,086
DRILLING METHOD AND APPARATUS
Filed June 24, 1965    2 Sheets-Sheet 1
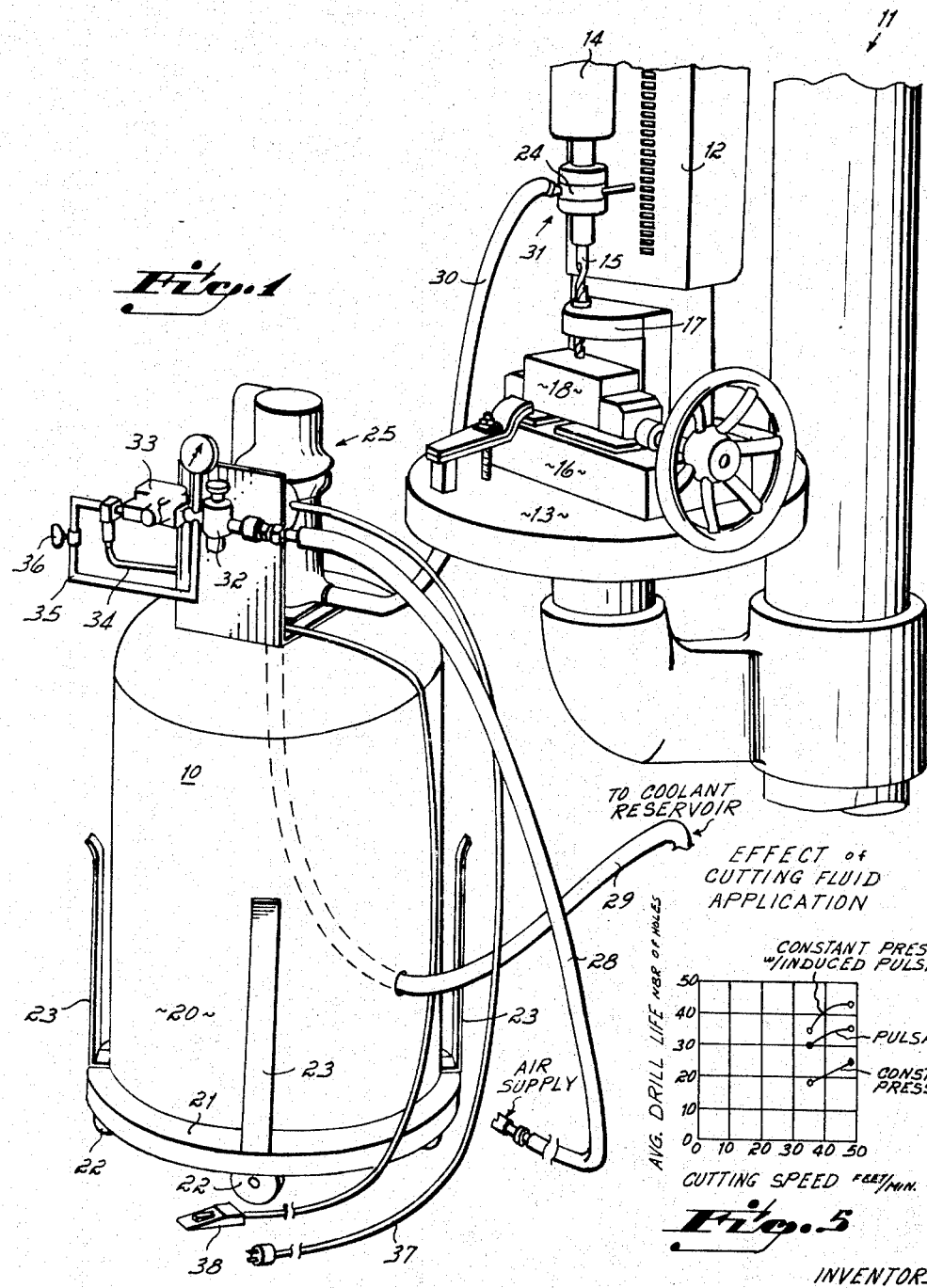
INVENTORS
Jess W. Borman
John P. Schaefer
BY Wood, Herron & Evans
ATTORNEYS

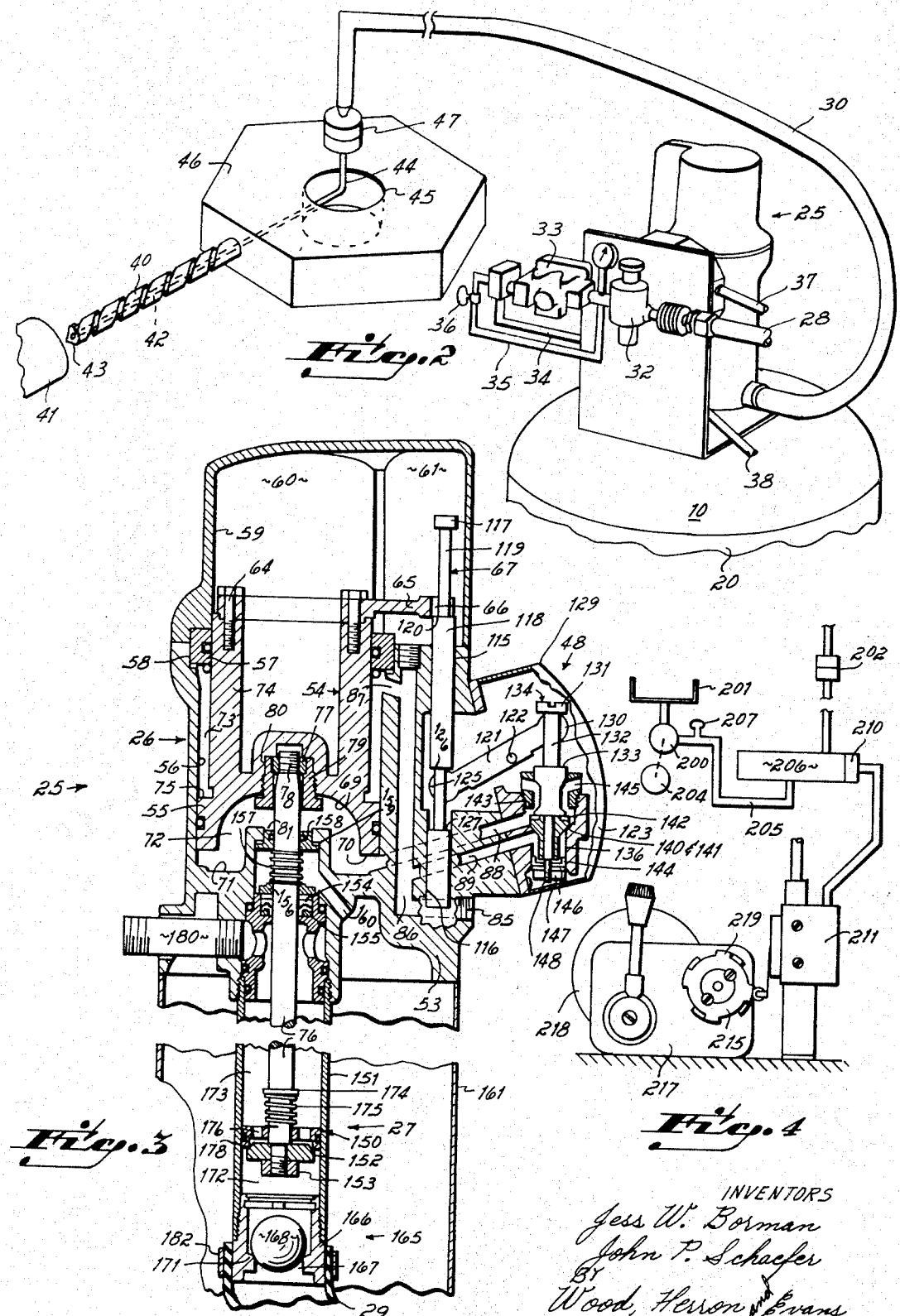

United States Patent Office 3,342,086
Patented Sept. 19, 1967

3,342,086
DRILLING METHOD AND APPARATUS
Jess W. Borman, Cincinnati, Ohio, and John P. Schaefer, Bennington, Ind., assignors to The Balcrank Division of The Wheelabrader Corporation, Cincinnati, Ohio, a corporation of Delaware
Filed June 24, 1965, Ser. No. 466,778
17 Claims. (Cl. 77—5)

ABSTRACT OF THE DISCLOSURE

A method and apparatus for supplying coolant to a tool for machining a hole in a workpiece by pulsating the flow of coolant through the tool so as to effect improved cutting efficiency and tool life.

---

This invention relates to a metal drilling method and apparatus and, more particularly, to a method and apparatus for cooling a drill and workpiece during a drilling operation.

One aspect of this invention is predicated upon the discovery that drilling efficiency and tool life of an oil hole drill or a drill in which cutting fluid is fed through the drill interior to the workpiece is substantially improved if the coolant pressure is regularly varied or pulsed during the drilling operation. It has therefore been an objective of this invention to increase tool life and cutting efficiency of a drill by improving both the method and apparatus for supplying coolant to the cutting edge of the drill.

Another objective of this invention has been to improve the cutting efficiency and tool life of conventional oil hole drills or drills in which coolant is supplied to the drill tip through the interior of the drill. We have found that regularly varying the pressure or pulsing the coolant or cutting fluid supplied to the drill produces much longer tool life than supplying the coolant at a high but constant pressure. Heretofore the general theory was to supply as much fluid as possible or to flood the drill tip in order to increase the efficiency. We have found, however, that better results are achieved, and the tool life increased by approximately fifty percent, by regularly, as for example fifty times a minute, interrupting or decreasing the coolant pressure supplied to the drill so that a pulsing flow is supplied to the drill tip.

We have also found that tool speed and feed rates may be substantially increased if the coolant to an oil hole drill is pulsed or supplied at regularly varying pressures.

The explanation for this increased efficiency and tool life is apparently very complex and involves both metal cutting and heat treating principles. One feasible explanation which is at least partially empirically provable, is that the interrupted coolant flow allows the chips to heat up so that when suddenly cooled, they fracture into smaller chips than would otherwise occur and are easily flushed through the flutes of the drill.

Another objective of this invention has been to provide an inexpensive, portable unit useable with any machine tool which is capable of drilling a hole to enable that machine to be used to drill holes with a drill of the type in which coolant or cutting fluid is supplied to the drill tip or cutting edge through the interior of the drill.

An oil hole drill requires coolant to be supplied to the tool under much higher pressures than those available from conventional machine tool coolant pumps. Therefore an inexpensive portable pump unit for use with an oil hole drill mounted in a conventional machine fitted with a low pressure coolant pump is a highly desirable unit which substantially broadens the cutting capabilities spectrum of a conventional machine tool.

Another objective of this invention has been to provide a portable high pressure coolant unit including a pneumatic motor driven hydraulic pump for supplying coolant to an oil hole drill. The primary advantage of a pneumatic motor driven unit is that it is inexpensive to operate and less subject to break down under adverse operating conditions than more conventional electric motor driven units. The inexpensive operation derives primarily from the fact that most machine shops have air pressure available and unused in the form of a ninety p.s.i. pressure line running throughout the shop for purposes of driving small pneumatic motors of portable hand tools or for blowing chips and dust away to clean machines and workpieces. By utilizing this untapped capacity, the unit is much less expensive to operate than electrically driven units.

Another objective of this invention has been to provide an improved portable coolant supply unit for converting a conventional low pressure coolant supply machine tool into one capable of use with oil hole drills. To increase the portability of such a unit, the pump is supported upon a roller mounted hollow base which serves the dual function of acting as a hose reel when the unit is in storage or in transit between machines.

These and other objects and advantages of the invention of this application will be more readily apparent from the following description of the drawings in which:

FIGURE 1 is a perspective view of the coolant pump unit of this invention applied to a drill press, FIGURE 2 is a perspective view, partially in diagrammatic form, of the pumping unit of this invention applied to a turret lathe, FIGURE 3 is a cross-sectional view of the pump and motor unit of FIGURE 1, FIGURE 4 is a diagrammatic illustration of a second embodiment of the inventive coolant pumping unit of this application, and FIGURE 5 is a graph of tool life plotted against feed rate to illustrate the differential in tool life achieved from different coolant delivery methods.

Referring first to FIGURE 1, and the preferred embodiment of the invention, a coolant pumping unit 10 is shown as applied to a conventional drill press 11. The drill press 11 includes the conventional vertical slideway 12 for supporting the vertically moveable tool head (not shown) having a rotatable spindle 14 for supporting a drill bit 15. The drill press 11 also includes a work support table 13 upon which is mounted a jig 16 having a guide bushing 17 for supporting the drill against lateral deflection as it is moved into a workpiece 18 clamped in the jig 16. The drill press 11 and jig 16 form no part of this invention and are only illustrated to show the operative environment of use of the invention of this application.

The coolant pumping unit 10 is a portable unit which may easily be removed from one machine and attached to another whenever an oil hole drilling operation is programmed for a machine. It consists of a cylindrical, hollow, sheet metal base 20 having a lower flange 21 mounted upon a plurality of rollers or casters 22. Hose retainer brackets 23 are welded or otherwise secured to the flange 21 so as to extend vertically parallel but spaced from the peripheral wall of the base 20. These brackets 23 permit the pump hoses and electrical lines to be wound upon the base 20 in the fashion of a hose reel with the lower portion of the base 20 serving as a reel and the brackets 23 serving as hose retainers.

In the preferred embodiment, the pump 27 and the motor 26 for driving the pump, are a unitary assembly 25 mounted on the top of the hollow base 20. The pump assembly 25 could, however, be mounted within the hollow base 20 if so desired.

The motor 26 is of the pneumatic type in which air under pressure is supplied to the motor 26 via an air supply line 28, through a regulator 32 and solenoid controlled valve 33, to a pump inlet line 34. A by-pass line 35 including a flow control or needle valve 36 is provided around the solenoid 33 between the regulator 32 and the pump inlet line 34 so as to pass a limited volume of air to the pump motor when the solenoid 33 is in the valve closed position. When the needle valve 36 is partially open and the solenoid is in the closed position, air through the by-pass 35 is operative to drive the motor 26 at a slow rate so as to pump a small volume of cutting fluid or coolant to the drill 15 at a low pressure. This low pressure cutting oil or coolant is useful to start a drilling operation before the drill enters the workpiece so as to limit the splashing. After the drill enters the workpiece, the solenoid may be energized and high pressure coolant supplied without excessive splashing. Alternatively, the needle valve 36 may be closed completely, in which event, only high pressure coolant will be supplied to the drill and that only when the solenoid 33 is energized.

Solenoid valve 33 is a conventional electrically actuated valve to which power is supplied from a conventional 110 volt A.C. source via line 37 through a foot pedal 38 control switch. As an alternative, the switch may be controlled automatically by tool feed displacement. Additionally, rather than being electrically controlled, the valve may be pneumatically controlled from an air operated microswitch.

The source of this air under pressure is one of the common lines of the plant or factory where the coolant unit is to be used. Most factories have such air supply lines running throughout the plant for cleaning parts or machines so that this is a convenient source of motive power.

Coolant is supplied to the pump assembly 25 from the machine coolant reservoir (not shown) via conduit 29. Since nearly all machines are equipped with coolant reservoirs, there is no need for the coolant unit 10 to be equipped with its own coolant source. Pulsating coolant or coolant in which the pressure of the coolant regularly varies at a predetermined frequency, is supplied from the pump to drill 15 via conduit 30 and rotary union or arbor 31. The rotary union or arbor 31 is a conventional coupling having a non-rotating collar 24 within which a drill supporting rotatable shaft is mounted and through which coolant is supplied to the drill 15.

While the coolant pumping unit 10 is usually used in connection with a drill press, it is equally adaptable to use in a turret lathe as illustrated in FIGURE 2. Lathes are often used to support a non-rotating drill 40 fed axially relative to a rotating workpiece 41. When drilling deep holes, it is preferable to use an oil hole drill in which coolant is supplied through the interior of the drill via a passage 42 to the cutting tip 43.

An oil hole drill may only be used in a turret lathe if provision is made for supplying coolant at high pressure to the drill. In the embodiment of FIGURE 2, this provision consists of a coolant supply tube 44 mounted in the turret 46 so as to interconnect the drill oil hole passage 42 with a central aperture 45 of the turret 46. The tube 44 is bent so that its free end extends vertically and is co-axial with the axis of rotation of the indexable turret 46. Connecting the upper end of the tube 44 to the output of the coolant pump unit 10 is a snap-fit rotary union 47 and the flexible supply conduit 30.

Referring now to FIGURE 3 and the preferred embodiment of the pump unit 10, as stated above the unit comprises the reciprocal pneumatic motor 26 for operating the reciprocating fluid pump 27. Reciprocation of the pneumatic motor 26 is controlled by a valve assembly 48. This pump, motor, and valve assembly, per se, form no part of the invention of this application and therefore will only be described in general terms.

Considering first the motor 26, it will be seen that it includes a motor cylinder body 53 in the form of a ported casting within which a piston 54 is reciprocable. The piston 54 has an enlarged flange or head 55 at its lower end which is in sliding engagement with the inner wall 56 of the cylinder body 53. Guiding the upper end of the piston 54 is a retainer ring 57 secured in a seat 58 defined between the upper edge of the cylinder body 53 and the lower edge of a piston guide cap or head 59. The inner wall 60 of this head 59 is configurated so as to provide a partially cylindrical bore for guiding support of the motor piston 54 as well as a recess 61 for reception of a portion of the motor valve reciprocating mechanism. Attached to the upper end of the piston 54 by means of bolts 64 is a laterally extending arm 65 having a recess 66 at its outer end for reception of a tripper rod 67 of the valve assembly 48.

The lower end or bottom of the piston 54 is defined by a generally semi-spherical recess 69 and flat bottom surface 70 of the piston head 55. The semi-spherical surface 69, the bottom surface 70, together with the cylinder side wall 56 and bottom surface 71 of the cylinder define the lower motor chamber 72. The upper chamber 73 of the motor 26 is defined between the bottom of retainer 57, the top of piston head 55, the cylindrical upper section 74 of piston 54 and the cylindrical wall 56 of the cylinder. The effective area against which the pressure supplied to the upper chamber 73 acts to force the piston 54 downwardly as viewed in FIGURE 3 is the upper surface 75 of the piston head 55. This surface is much smaller in area than the total area of the lower piston surfaces 69, 70 so that when equal pressures are applied to both sides, the total force applied to the bottom of the piston is much greater than that applied to the top with the result that the piston is moved upwardly.

Depending from the bottom of motor piston 54 is a piston rod 76. This rod is attached to piston 54 by means of a nut 77 threaded on to the upper end 78 of the rod. The nut 78 is in turn clamped by means of a clamp nut 79 within a recess 80 in the bottom of the piston 54. The piston rod 76 extends through an aperture 81 of the motor cylinder body 53 and supports the pump piston as is explained hereinafter.

The porting through the motor cylinder body 53 to the upper chamber 73 or the air motor consists of a pressure port 85 connected via a vertical conduit 86 to an inlet port 87 of the upper chamber 73. The lower chamber 72 is connected via a conduit 88 to the reciprocating valve assembly 48. This valve assembly 48 is in turn connected to the pressure conduit 86 via a conduit 89. In operation, the pressure port 85 is connected to an air pressure line of approximately fifty to ninety p.s.i. depending upon the size drill and other variables such as splash, hole depth, etc.

The valve assembly 48 is controlled by the tripper rod 67. This rod 67 is reciprocable within a pair of aligned apertures 115, 116 of the motor cylinder body 53. Reciprocation of the rod is controlled by the arm 65 attached to the top of the motor piston 54. For this purpose, it is provided with an enlarged head 117 connected to the body 118 of the rod by a thin stem 119. At the upper end of its stroke, the arm 65 engages the bottom of the head 117 causing the tripper rod 67 to be moved upwardly. At the lower end of its stroke and in the position illustrated in FIGURE 3, the arm 65 engages a shoulder 120 of the rod 67 and forces the rod downwardly from the position illustrated in this figure. By these movements, the rod 67 controls a toggle 121 which in turn controls a spool valve of the reciprocating valve assembly 42.

The toggle 121 is the connecting link between the pneumatic motor 26 and valve 48. It is pivotally mounted upon a pivot pin 122 which is in turn supported by the valve casing 123. One end 125 of the toggle 121 is engageable with a pair of spaced shoulders 126, 127 of the tripper rod 47. Upon downward movement of the rod 67, shoulder 126 engages the top of the toggle 121 and pushes it downwardly while on upward movement of the rod, the shoulder 127 engages the bottom of the toggle 121 and pushes it upwardly.

The valve 48 consists of a two piece body or casing 123 secured to the motor body 53 and within which a two piece spool 134 is movable. To keep dust and dirt out of the valve, a cap 129 is secured over it.

The end 130 of the toggle opposite end 125 is engageable in one position with a head 131 attached to stem 132 of spool 134. In the other position to which the toggle is movable, it engages a shoulder 133 of the spool 134 to force the spool 134 downwardly from the position illustrated in FIGURE 3.

Spool 134 is slidable within a bore 136 of the valve housing 123. This housing is ported so as to cooperate with the ports 88, 89 of the air motor cylinder body 53 to control the connection of the motor lower chamber 72 with either exhaust or high pressure.

As shown in FIGURE 3, the conduit 88 in the cylinder body 53 is connected to exhaust or atmospheric pressure through valve ports 145. High pressure in conduit 89 is at this time precluded from entering conduit 88 by a tapered seat 140 of the valve 134 engaging a correspondingly tapered seat 141 of the housing 123.

When the spool 134 is moved upwardly from the position shown in FIGURE 3 by the toggle 121, a rubber seat 142 of the spool engages a shoulder 143 of the housing 123 and is so doing, blocks the passage of air through the conduit 88 to exhaust via passages 145 in the valve housing 123. Simultaneously, the upward displacement of the spool 134 results in the opening of the tapered seat 140, 141 between the spool and the housing so that high pressure air may pass from the inlet port 85, through the conduit 89, past the seat 140, 141 and into the conduit 88 to the lower chamber 72 of the air motor.

In order to preclude the escape of high pressure air in conduit 89 through the lower portions of the bore 136 in the housing 123, a leather gasket 144 is attached to the bottom of the spool 134 by a washer 146 and nut 147 threaded onto the threaded lower end 148 of the spool.

The pump 27 consists of a piston 150 movable within a pump cylinder 151. This cylinder is threaded into and depends from the motor body 53. Vertical movement of a piston 150 within the cylinder 151 is controlled by the piston rod 76 of motor 26. This piston 150 acts as a valve in cooperation with a valve plate 152 attached to the bottom of piston rod 76 by means of a nut 153 threaded onto the lower end of the piston rod 76.

A conventional packing ring 154 is secured between the piston rod 76 and the sleeve 151 to prevent leakage of fluid from the pump into the motor. The packing ring 154 is secured within a recess 155 in the top of the cylinder 151 by a cap or washer 156. The washer 156 is secured against the top of cylinder 151 by a spring 157 compressed between washer 157 and a washer 158 seated in a recess 159 of the motor body 53. Any fluid which does inadvertently pass the packing ring or gland 156 is exhausted from the motor body 53 through an exhaust conduit 160 which is connected to atmospheric pressure within a pump casing 161.

Attached to the lower end of the pump cylinder 151 is a one-way ball valve 165. This valve consists of a valve body 166 having a restricted passage 167 which supports a ball 162.

Normally the ball 168 rests upon the restricted passage defining section 171 of the valve body 166 so as to close the restricted passage 167. Thus, fluid entrapped within the lower chamber 172 of the pump cannot flow out through the restricted passage 167. However, if the pressure above the ball 168 is less than the pressure beneath the ball 168, the ball 168 will be lifted from its seat so that fluid may flow into the chamber 172. This occurs when the piston 150 is moved upwardly upon an upward stroke of the motor piston 54.

The pump piston 150 is slidably mounted upon the motor piston rod 76. Its sliding movement is however limited or restricted by valve plate 152 and by a compression spring 175 mounted over the rod 76 between a rod flange 174 and the upper side of the piston 150. This spring normally biases the piston 150 downwardly into engagement with the valve plate 152.

To permit the flow of fluid through the piston 150, the plate 152 has a plurality of apertures 176 through which fluid may pass from the lower pump chamber 172 into the upper chamber 173.

Upon a downstroke of the motor piston 54 and piston rod 76, fluid trapped in the lower chamber 172 of the pump by the one-way check valve 165, acts upon the exposed lower surface 178 of the piston 150 to force the piston 150 upwardly relative to the valve plate 152 and thus creates a passage for fluid entrapped in the lower chamber 172 to move into the upper chamber 173 through the apertures 176 in the piston 150. On the upstroke, the piston 150 remains seated against the valve plate 152 so that fluid is forced out of the pump via an exit tube 180 which communicates with the upper pump chamber 173. In the preferred embodiment, the pressure of the fluid exiting through the tube 180 is four times as great as the pressure of the air entering through port 85 to drive the pump motor. However, a seven to one ratio pump, in which the fluid pressure is seven times as great as the entering air pressure, has also been found satsifactory for this use.

In operation, air pressure is supplied to the pump unit by connecting a line 34 to the inlet port 85. This air pressure is usually in the neighborhood of 50 to 90 pounds per square inch. The lower end of the pump cylinder 151 is connected to a source of coolant by the hose 29 and hose clamp 182. The end of the hose 29 opposite the end attached to pump 27 is fitted with a 30 mesh (per lineal inch) screen filter (not shown) which rests within the coolant pump or tank (not shown) of the machine with which the unit is being used. The outlet tube 180 of the pump 27 is connected via the conduit 30 to the rotary union or arbor 32 or 47.

With the pump unit in the position illustrated in FIGURE 3, high pressure air is supplied from the port 85 through conduits 86 and 87 to the upper chamber 73 of the motor. Simultaneously, the lower chamber 72 of the motor is connected via conduit 88 and valve ports 145 of the valve assembly to exhaust or atmospheric pressure. In this position of the valve, the motor piston 54 continues to move downwardly until the arm 65 engages the shoulder 120 of the tripper rod 67, causing the rod to move downwardly from the position illustrated in FIGURE 3 and to pivot the toggle 121 about the pivot pin 122. This results in upward movement of the spool 134 until the rubber gasket 142 of the valve seats and seals against the shoulder 143 of the valve housing 123 so that the lower motor chamber 72 is no longer connected to atmospheric pressure. This spool movement results in the lower chamber 72 being connected to the high pressure port 85 via the conduits 86, 89 and 88 so that the same high pressure exists in the lower chamber 72 as in the upper chamber 73. However, because the piston area in the lower chamber 72 is much greater than the piston area in the upper chamber 73, the piston 54 is caused to move upwardly until the arm 65 engages the head 117 of the tripper rod 67 and moves the rod into its upper position. This results in the shoulder 127 engaging the lower side of the toggle 121, causing the toggle to pivot in a clockwise direction as viewed in FIGURE 3 until the bottom of the toggle engages the shoulder 133 of the spool 134 and forces the spool downwardly back into the position shown in FIGURE 3.

As the motor piston 54 and piston rod 76 move upwardly, valve plate 152 and piston 150 move up forcing any fluid entrapped in the upper chamber 173 out through the outlet pipe 180 of the pump. Simultaneously, it draws a vacuum on the lower chamber 172 between the ball 168 and the valve plate 152, causing the ball 168 to lift so that fluid is pulled into the lower chamber 172 from the coolant sump. When thereafter, the motor piston 54 moves downwardly, that fluid trapped in the lower chamber 172 between valve plate 152 and ball 168 must move from the lower chamber 172 into the upper chamber 173. It does so by forcing the piston 150 upwardly relative to the valve plate 152 by compressing spring 175 so that fluid passes between valve plate 152 and piston 150 through ports 176 into the upper chamber 173 as the piston rod 76 moves downwardly. Thereafter, on the upstroke, that fluid which has just passed into the upper chamber 173 upon the downstroke of the piston rod 76, is forced out of the upper chamber 173 and exits through the outlet tube 180. The pressure at which this fluid exits through the outlet tube 180 in the preferred embodiment is approximately four times as great as the air pressure entering through the inlet port 85. It is, of course, a pulsating pressure which varies from maximum pressure to zero during each pump cycle because of the reciprocal nature of the pump and because there is no accumulator to even out the pressure.

As an alternative pumping unit for supplying pulsating coolant to a tool, a second embodiment is illustrated in FIGURE 4. In this embodiment, a constant pressure pump 200 such as a rotary vane pump is used to supply coolant from a sump or tank 201 to a rotary union 202 and subsequently to a tool. The rotary union may be the same union 47 illustrated in FIGURE 2 or the union 32 illustrated in FIGURE 1.

The pump 200 is driven by a conventional electric motor 204. Inserted into the pump outlet line 205 between the pump 200 and the rotary union 202 is a conventional solenoid valve 206 which, when the solenoid 210 is energized, blocks the flow of fluid to the rotary union 202 and tool. In order to handle the back pressure in line 205 when the valve 206 is closed, a conventional fluid pressure accumulator 207 is inserted in line 205 between the pump 200 and valve 206.

In this embodiment, the solenoid 210 of solenoid valve 206 is controlled by a switch 211. When the switch 211 is closed, the solenoid 210 is energized and the valve 206 blocks the flow of fluid to the union 202 and thus to the tool (not shown); but when de-energized, the valve 206 routes the fluid from conduit 205 to the rotary union and subsequently to the tool.

Controlling the energization of switch 211 is a rotary cam 215 mounted on the output shaft of a gear reduction unit 217. The gear reduction unit is driven from an electric motor 218 at any selected speed within a limited range. The preferred speed of the cam plate 215 was found to be about 12 or 13 revolutions per minute so that the four lobes 219 of the cam closed the switch 211 at a rate of approximately 50 times per minute. This resulted in a pulsating pump pressure being supplied to the rotary union 202 and thus to the oil hole drill (not shown) under pressure which pulsed at a rate of approximately 50 pulses per minute. With this arrangement the pressure varied or pulsed between approximately 70 p.s.i. and 120 p.s.i. While the systems disclosed in FIGURES 1 and 2 are considered to be preferable to that illustrated in FIGURE 4, this latter system was satisfactory and did establish that a pulsating pressure of even this frequency and of this pressure differential was satisfactory to prolong the life of the tool and to increase the maximum tool feed rate.

Test results utilizing the setup of FIGURE 1 (indicated as "Pulsating" line on graph) and FIGURE 4 (indicated on graph as "Constant Pressure w/Induced Pulsation") as well as a conventional constant pressure pump ("Constant Pressure") for supplying the tool with coolant under pressure are shown graphically in FIGURE 5. To obtain these results, half-inch diameter holes were drilled in 4340 steel of 300 to 325 Brinnel hardness. In each case the drill was a half-inch diameter, high-speed steel, oil hole tapered web drill with a point angle of 118 degrees and a clearance of 17 degrees. The drill was fed into the workpiece at a feed rate of .005 inch per revolution and the cutting flux was a soluble oil. Tool life end points were established whenever a wearland of .015 inch was observed on the lip of the drill. The results of these tests were as follows:

TOOL LIFE
[No. of holes drilled]

| Cutting Speed, ft./minute | Constant Pressure (3.0 gal./min.) (200 p.s.i.) | FIGURE 4 Constant Pressure, Induced Pulsation (2.5 gal./min.) (70 to 120 p.s.i.) | FIGURE 1 Pulsating (2.0 gal./min.) (0 to 200 p.s.i.) |
|---|---|---|---|
| 35 | 19 | 36 | 36, 24 |
| 48 | 24, 26 | 53, 43, 34 | 34, 40, 49 |

Graphically, the results are shown in FIGURE 5.

These tests clearly establish that pulsating the coolant supplied to an oil hole drill results in a tool life approximately 60 percent greater than that achieved using a constant pressure coolant source. And this was true even though the quantity of coolant supplied to the drill with the constant pressure source was as much as 50 percent greater than the quantity of coolant supplied with a pulsating source.

It was also found during the test of the oil hole drill pulsating coolant supply versus constant pressure coolant source, that the pulsating coolant was much more efficient than the constant pressure. In fact, the pulsating enabled the drill penetration maximum rate (drill feed multiplied by drill speed) to be increased substantially over that possible with constant pressure coolant.

This invention not only contributes to the tool life and feed rate of oil hole drills but also provides a convenient portable accessory unit which may be used with conventional jig borers or drill presses or even lathes to adapt these machines for use with oil hole drills even though they have no coolant source or a coolant source of insufficient pressure to enable the machine to be used for this purpose.

While only two embodiments of the invention have been disclosed and described herein, those skilled in the art to which this invention pertains will readily appreciate numerous changes and modifications which may be made in the invention without departing from the spirit thereof. Therefore we do not intend to be limited except by the scope of the appended claims.

Having described our invention we claim:

1. The method of drilling a hole in a workpiece which comprises:
    effecting relative rotational movement between a workpiece and a drill while said drill remains in engagement with said workpiece,
    supplying coolant fluid through a passageway in said drill terminating adjacent to the tip thereof, said coolant fluid being supplied to said workpiece so as to cool said drill and workpiece and flush chips away from the tip of said drill, and
    varying the pressure of the coolant flowing through said drill by at least 30 percent at a frequency of at least 30 times per minute so as to regularly pulse the fluid flow to said drill tip.

2. The method of drilling a hole in a workpiece which comprises:
    effecting relative rotational movement between a workpiece and a drill while said drill remains in engagement with said workpiece,
    supplying coolant to said drill tip through a passageway terminating adjacent said tip at a low pressure at the time said drill initially contacts and partially enters said workpiece, thereafter supplying coolant fluid through said passageway in said drill to said workpiece at a high pressure so as to cool said drill and workpiece and flush chips away from the tip of said drill, and regularly varying the pressure of the coolant flowing through said drill so as to pulse the fluid flow to said drill tip.

3. The method of drilling a hole in a workpiece which comprises:

effecting relative rotational movement between a workpiece and a drill while said drill remains in engagement with said workpiece, supplying coolant to said drill tip through a passageway terminating adjacent said tip at a low pressure at the time said drill initially contacts and partially enters said workpiece, thereafter supplying coolant fluid through said passageway in said drill to said workpiece at a high pressure so as to cool said drill and workpiece and flush chips away from the tip of said drill, and regularly varying the pressure of the coolant flowing through said drill by at least 30 percent so as to pulse the fluid flow to said drill tip.

4. In a machine tool having a rotatable tool mounted in a rotatable member, said rotatable tool including an axial passageway terminating adjacent to the tip of said tool, the improvement which comprises a portable unit for supplying coolant through said axial passageway of said tool, said portable unit comprising:

a floor supported base, a single acting reciprocal fluid pump mounted upon said base, said pump being operable to regularly vary the pressure of fluid being pumped through an outlet of said pump, inlet conduit means having one end attached to the inlet of said pump and the other end adapted to be inserted into the coolant reservoir of the machine tool with which the unit is to be utilized, outlet conduit means connected at one end to the outlet of said pump, a rotary union attached to the other end of said outlet conduit and adapted to be attached to said rotatable member of said machine tool, pneumatic motor means mounted upon said base and operatively associated with said pump so as to control fluid flow from said pump to said rotary union, and control means operable to control said pneumatic motor means.

5. In a machine tool apparatus having a rotatable tool mounted in a rotatable member of the machine tool, said rotatable tool including an axial passageway terminating adjacent to the tip of said tool, the improvement which comprises a portable unit for supplying coolant through said axial passageway to the tool, said portable unit comprising:

a lightweight, hollow, floor supported base, a reciprocal fluid pump mounted upon said base, said pump being operable to regularly vary the pressure of fluid being pumped through an outlet of said pump so as to generate a pulsating flow, inlet conduit means having one end attached to the inlet of said pump and the other end adapted to be inserted into the coolant reservoir of the machine tool with which the unit is to be utilized, outlet conduit means connected at one end to the outlet of said pump, a rotary union attached to the other end of said outlet conduit and adapted to be attached to said rotatable member of said machine tool, pneumatic motor means supported upon said base and operable to drive said pump, valve means supported upon said base and operatively associated with said motor means so as to control said motor and thus control fluid flow from said pump to said rotary union, and switching means operable to control said valve means.

6. In a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a base, a single piston, reciprocating pump supported by said base, a first conduit for supplying coolant from a reservoir to said pump, a second conduit for supplying coolant from said pump to said drill, and means including said pump for supplying coolant through said drill passageway at regularly varying pressures whereby said coolant pulses in its flow through said drill.

7. In a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a base, a reciprocal piston pump supported by said base, a first conduit for supplying coolant from a reservoir to said pump, a second conduit for supplying coolant from said pump to said drill, and means including said pump for supplying coolant through said drill passageway at regularly varying pressures whereby said coolant pulses in its flow through said drill, said means including a pneumatic motor for driving said pump from an air presure source.

8. In a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a base, a reciprocal piston pump supported by said base, a first conduit for supplying coolant from a reservoir to said pump, a second conduit for supplying coolant from said pump to said drill, means including said pump for supplying coolant through said drill passageway at regularly varying pressures whereby said coolant pulses in its flow through said drill, said means including a pneumatic motor for driving said pump, a source of air pressure connected by an air conduit for operating said motor, and valve means in said air conduit for controlling the operation of said motor.

9. In a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a base, a reciprocal piston pump supported by said base, a first conduit for supplying coolant from a reservoir to said pump, a second conduit for supplying coolant from said pump to said drill, means including said pump for supplying coolant through said drill pasageway at regularly varying pressures whereby said coolant pulses in its flow through said drill, said means including a pneumatic motor for driving said pump, a source of air pressure connected by an air conduit to said motor for operating said motor, solenoid operated valve means in said air conduit for controlling the flow of air through said air conduit to said motor, and an electrical switch for controlling said valve means.

10. In a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a base, a reciprocal piston pump supported by said base, a first conduit for supplying coolant from a reservoir to said pump, a second conduit for supplying coolant from said pump to said drill, means including said pump for supplying coolant through said drill passageway at regularly varying pressures whereby said coolant pulses in its flow through said drill, said means including a pneumatic motor for driving said pump, a source of air pressure connected by an air conduit to said motor for operating said motor, valve means in said air conduit for controlling the flow of air through said air conduit to said motor, control for opening said valve means, and means including by-pass air conduit means around said valve means for operating said pneumatic motor at a slow speed until said valve opens whereby fluid at a relatively low pressure may be supplied to said drill until said drill enters said workpiece and thereafter fluid at a relatively high pressure may be supplied to said drill.

11. In a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a pump, a first conduit for supplying coolant from a reservoir to said pump, a second conduit for supplying coolant from said pump to said drill, means including said pump for supplying coolant through said drill at regularly varying pressures whereby said coolant pulses in its flow through said passageway of said drill, said means including a valve in one of said conduits and means for operating said valve at a regular frequency.

12. In a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a pump, a motor for operating said pump, a first conduit for supplying coolant from a reservoir to said pump, a second conduit for supplying coolant from said pump to said drill, means including said pump for supplying coolant through said drill at regularly varying pressures whereby said coolant pulses in its flow through said passageway of said drill, said means including a valve and rotating cam means for operating said valve at a regular frequency.

13. In a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a fluid pump, an electric motor for operating said pump, a first conduit for supplying coolant from a reservoir to said pump, a second conduit having a pressure accumulator therein for supplying coolant from said pump to said drill, a solenoid operated valve in said second conduit for controlling the flow of fluid from said pump to said drill, electrical switch means for controlling said solenoid valve, a rotary cam operable to control said switch means, and means for driving said cam so as to control the opening and closing of said switch means at a regular frequency whereby said valve operates to vary the pressure of fluid supplied through said drill passageway by pulsing said fluid flow.

14. The method of drilling a hole in a workpiece which comprises:

effecting relative rotational movement between a workpiece and a drill while said drill remains in engagement with said workpiece, supplying coolant fluid through a longitudinal passageway in said drill terminating near the tip thereof to said workpiece so as to cool said drill and said workpiece and to flush chips away from the cutting tip of said drill, and regularly varying the pressure of the coolant flowing through said drill so as to pulse the fluid flow to said drill tip.

15. The method of drilling a hole in a workpiece which comprises:

effecting relative rotational movement between a workpiece and a drill while said drill remains in engagement with said workpiece, supplying coolant fluid through a longitudinal passageway in said drill terminating near the tip thereof to said workpiece so as to cool said drill and workpiece and flush chips away from the tip of said drill, and varying the pressure of the coolant flowing through said drill at a frequency of at least 30 times per minute so as to regularly pulse the fluid flow to said drill tip.

16. The method of drilling a hole in a workpiece which comprises:

effecting relative rotational movement between a workpiece and a drill while said drill remains in engagement with said workpiece, supplying coolant fluid through a longitudinal passageway in said drill terminating near the tip thereof to said workpiece so as to cool said drill and workpiece and flush chips away from the cutting tip of said drill, and regularly varying the pressure of the coolant flowing through said drill by at least 30 percent so as to pulse the fluid flow to said drill tip.

17. In a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a pump, a first conduit for supplying coolant from a reservoir to said pump,
a second conduit for supplying coolant from said pump to said drill, and
means including said pump for supplying coolant through said drill passageway at regularly varying pressures whereby said coolant pulses in its flow through said drill.

References Cited

UNITED STATES PATENTS

| 730,045 | 6/1903 | Porterfield | 77—5 |
| 1,398,338 | 11/1921 | Mirrielees | 77—55.3 |
| 1,469,368 | 10/1923 | Thacher | 10—106 |
| 1,506,652 | 8/1924 | Maker | 29—106 |
| 2,067,635 | 1/1937 | Harris et al. | 103—50 |
| 2,299,852 | 10/1942 | Shaner et al. | 29—106 |
| 2,851,764 | 9/1958 | White | 29—106 |
| 2,977,827 | 4/1961 | Wenz | 77—55.3 |
| 3,177,627 | 4/1965 | Gulbert et al. | 51—267 |

FOREIGN PATENTS 788,032  12/1957  Great Britain.

FRANCIS S. HUSAR, *Primary Examiner.*